United States Patent
Zhu et al.

(10) Patent No.: US 9,185,143 B2
(45) Date of Patent: Nov. 10, 2015

(54) METHOD AND SERVICE SERVER FOR CORRELATIVE PROCESSING OF SERVICE INFORMATION

(75) Inventors: Lei Zhu, Shenzhen (CN); Lei Xie, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1038 days.

(21) Appl. No.: 12/357,180

(22) Filed: Jan. 21, 2009

(65) Prior Publication Data

US 2009/0144356 A1 Jun. 4, 2009

(30) Foreign Application Priority Data

Nov. 3, 2006 (CN) .......................... 2006 1 0138304
Nov. 5, 2007 (WO) ................ PCT/CN2007/071017

(51) Int. Cl.
  *G06F 15/16* (2006.01)
  *H04L 29/06* (2006.01)
(52) U.S. Cl.
  CPC ......... *H04L 65/1063* (2013.01); *H04L 65/1016* (2013.01)
(58) Field of Classification Search
  CPC .................... H04L 29/06217; H04L 29/06312
  USPC .................................................. 709/201, 240
  See application file for complete search history.

(56) References Cited

U.S. PATENT DOCUMENTS

| 2006/0087982 A1* | 4/2006 | Kuure et al. .................. 370/252 |
| 2006/0153102 A1* | 7/2006 | Kuure et al. .................. 370/263 |
| 2007/0121622 A1 | 5/2007 | Zhu et al. |

FOREIGN PATENT DOCUMENTS

| CN | 1469585 A | 1/2004 |
| CN | 1585411 A | 2/2005 |
| CN | 1832473 A | 9/2006 |
| WO | WO2006000624 A1 | 1/2006 |

OTHER PUBLICATIONS

Chentouf et al. "Implementing Online Feature Interaction Detection in SIP Environment: Early Results". 2003 IEEE.*
International Search Report issued in corresponding PCT Application PCT/CN2007/071017; mailed Jan. 3, 2008.
Chentouf, Z. et al. "Implementing Online Feature Interaction Detection in SIP Environment: Early Results" Telecommunications, 2003. ICT 2003. 10$^{th}$ International Conference. Feb. 23, 2003:515-521.

(Continued)

*Primary Examiner* — Bryan Lee
(74) *Attorney, Agent, or Firm* — Staas & Halsey LLP

(57) ABSTRACT

The present embodiments disclose a method and a service server for correlative processing of service information. The method includes receiving the service information; obtaining a correlative relation among information of each service; and performing a correlative processing on the service information according to the correlative relation. A correlative processing may be performed on the service messages of various applications based on IMS (IP Multimedia Subsystem) architecture, thereby the user experience of the service may be improved, and the service performance may be enhanced.

7 Claims, 5 Drawing Sheets

(56) References Cited

OTHER PUBLICATIONS

Crespi, Noel. "A Distributed Mechanism to Resolve Dynamically Feature Interaction in the UMTS IP Multimedia Subsystem" May 2006: 1-8 http://www.it-sudparis.eu/rs2m/ncpub/006/ASWN/A distributed mechanism to resolve dynamically Featured Interaction in the UMTS IP Multimedia Subsystem-ASWN.pdf retrieved Sep. 9, 2008.

Zhu, Lei et al. "Overlapping Media Burst Control Scheme" Nov. 5, 2006: 1-3 URL:http://member.openmobilealliance.org/ftp/Public_documents/MWG/MWG-POCv2/2006/OMA-POC-POCv2-2006-1157-Cr_SD-Overlaping_MBC_Schemes.zip retrieved Sep. 9, 2009.

Zhang, Aegean, et al. "CP-Media Burst Control Scheme(s) was 632" Aug. 24, 2006:1-24. URL:http://member.openmobilealliance.org/ftp/Public_documents/MWG/MWG-POCv2/2006/OMA-POC-POCv2-2006-0714R01-Cr_CP_Media_Burst_Control_Scheme_s_was_632.zip retrieved Sep. 9, 2009.

Motorola "Arbitration Mode and MBCP Schemes" Aug. 12, 2006 URL:http://member.openmobilealliance.org/ftp/Public_documents/MWG/MWG-POCv2/2006/OMA-POC-POCv2-2006-0675-INP_Aribtration_Mode_and_MBCP_Schemes.zip. retrieved Sep. 9, 2009.

Supplementary European Search Report issued in corresponding European Patent Application No. 07 81 7208; issued Sep. 9, 2009.

Written Opinion of the International Searching Authority mailed in corresponding PCT Patent Application No. PCT/CN2007/071017, mailed Jan. 3, 2008.

First Office Action issued in Chinese Patent Application No. 200610138304.X, mailed Nov. 6, 2009.

Second Office Action issued in Chinese Patent Application No. 200610138304.X, mailed Nov. 2, 2010.

Third office action of corresponding Chinese Patent Application No. 200610138304.X, mailed on Nov. 3, 2011, English translation thereof, 6 pages total.

Fourth office action in corresponding Chinese Patent Application No. 200610138304.X, mailed on Mar. 28, 2012, English translation thereof, 7 pages total.

First office action of corresponding European Patent Application No. 07817208.7, mailed on Feb. 21, 2012, 6 pages total.

\* cited by examiner

METHOD AND SERVICE SERVER FOR CORRELATIVE PROCESSING OF SERVICE INFORMATION

This application is a continuation of International Application No. PCT/CN2007/071017, filed on Nov. 5, 2007, which claims the priority of a Chinese Patent Application No. 200610138304.x, entitled "METHOD FOR CORRELATIVE PROCESSING OF SERVICE INFORMATION", filed on Nov. 3, 2006 with the Chinese State Intellectual Property Office, all of which are hereby incorporated by reference in their entireties.

FIELD

The present embodiments relate to a method and a service server for correlative processing of service information.

BACKGROUND

With the development of broadband networks, mobile communication is no longer limited to traditional voice communication. Multimedia service in conjunction with various media types, such as audio, video, picture, and text, will continue to be developed. With the combination of data services, such as Presence (Presence service), Short Messages, WEB browsing, location information, PUSH (push service), file sharing and the multimedia services, various requirements from users may be met. The multimedia services include:

1) Message Services: instant messages, chat rooms and multimedia short messages;

2) Video Services: entertainments, multimedia information exchange and daily intercommunion;

3) Electronic Commerce: product directories, search engines, shopping service, order management and payment;

4) Games: single-player games and group games;

5) Location Services: Seeking the Missing, Guide and Alarm; and

6) Personal Assistants: address books, schedules, bookmark management, file storages, events reminder and E-mail.

With the promotion of various multimedia applications, a standard organization of 3rd Generation Partnership Project (3GPP) puts forward an Internet Protocol (IP)-based IP Multimedia Subsystem (IMS) architecture, which aims to realize various multimedia applications in a communication network by using a standardized open structure and provide with users more choices and more abundant experiences.

Session Initiation Protocol (SIP) was developed in the middle of 1990s. The SIP may be used for controlling the stream transmission of audio/video contents on a Web. SIP messages are based on text to be easily read, debugged and programmed, and thus more intuitively to designers.

Similar to an E-mail client, SIP re-uses the type of Multipurpose Internet Mail Extension (MIME) description and a plurality of existing mature Internet services and protocols, such as Domain Name System (DNS), Real Time Transport Protocol (RTP), and Resource Reservation Protocol (RSVP). Therefore, all session-related applications may initiate automatically without any new service to support SIP infrastructure.

SIP is independent of the Transmission Layer, and the underlay transmission of SIP may employ IP over Asynchronous Transmission Mode (ATM). Users independent of the underlay infrastructure may be flexibly connected by SIP using User Datagram Protocol (UDP) and Transmission Control Protocol (TCP).

SIP supports multi-device function adjustment and negotiation. If a service or a session initiates videos and voices, the voices may be transmitted to a device that does not support videos; other device functions, such as one-way video stream transmission function may also be used.

With the developments of network technologies, multi-party communication has becomes a prevalent service. In order to realize multi-party communication, a concentrated control point is required to manage the multi-party communication, thereby the consistency and real-time characteristic of the management may be guaranteed. For example, when a user applies for sending an audio service, the system, such as a Push-to-talk Over Cellular (PoC) system and a Conference (a server providing a function of user states) system, needs one control point, and only one control point, for judgment.

A PoC system is a central-controlled multi-party multimedia communication system, which is a Push-To-Talk (PTT) service realized on a cellular system as defined by Open Mobile Alliance (OMA). The concept of the PoC service comes from interphones. The usage mode of the PoC service experienced by users is similar to that of the interphone. The PoC service may realize simple and shortcut half-duplex communication manner. By pre-configuring a communication group, a user may deliver the voice to all the other members in the group during communication simply by pushing a specific button, without dialing the number. The push-to-talk, calling and call connecting are accomplished instantly, and the receiving party may hear the voice without any responsive operations. The communication process of the PoC service employs half-duplex mode, in which when one party is speaking, other members can only listen to the speaker without speaking.

The OMA is responsible for drawing up the PoC standard specifications, in which the defined network structural diagram of the PoC specification is shown in FIG. 1, which includes the following primary entities:

1) a PoC Server, serving as a primary call control device for the PoC service and an Application Server in IMS network;

2) a PoC XDMS, serving as a server for storing data, such as group information required by the PoC services;

3) a PoC Client, serving as a PoC Client, the PoC Client together with the PoC Server adapted to initiate and receive a PoC call, request a floor, and make a speech.

The PoC service is a half-duplex voice and multimedia communication system. After a PoC group call is established, the user may apply to the PoC Server for the floor via Talk Burst Control Protocol (TBCP). The user may only be allowed to speak upon obtaining the floor, and thereby the media stream sent by the speaking may be forwarded to other members of the group by the PoC Server.

POC2.0 is a higher version of the PoC service that is being drawn up by OMA at present, and it is an extension and upgrade of the service defined in POC1.0. POC2.0 allows a user to establish a multimedia session for instant communication with other one or more users via a specific button, and allows the user to deliver various media types during the session, such as static pictures, real-time video streams, file transmission and texts. POC2.0 is back compatible to POC1.0, and also supports the half-duplex voice service in POC1.0.

The PoC service information includes:

1) user setting messages, such as PoC service settings, PoC access control settings and CPM user settings;

2) system setting messages, such as Operator's policies;

3) indication messages in signaling messages, such as response mode, access priority and order and Media Burst Control Scheme (MBC Scheme);

4) indication messages in media control messages, such as version indication in a TBCP or MBCP message;

5) service information saved in the network system, such as MBC Scheme in the group information;

6) user subscription information, such as access criteria of a service used by a user.

The network operation for the PoC service is usually determined according to various information, such as the above user setting messages, indication of the signaling plane message, indication of the user plane message (media control message), the user subscription messages, service information saved in the network system and Operator's policies. With the development of the PoC service, there will be more and more messages, such as the above user setting messages, service information saved in the network system, Operator's policies.

At present, in the above service information, except that part of the Operator's policies may be configured mutual exclusively, there exists no method for correlative processing among user setting messages, among the indication information in signaling messages, among the indication information in media control information, among service messages saved in the network system, and among user subscription information.

SUMMARY

The present embodiments provide a method and a service server for correlative processing of service information, thereby the service messages of various applications under IMS architecture may be correlatively processed.

In one embodiment, a method for correlative processing of service information is provided. The method includes the acts of: receiving service information; obtaining correlative relations among information of each service; and processing correlatively the service information according to the correlative relations.

In another embodiment, a service server is provided. The service server includes a first module, for receiving service information; a second module, for obtaining correlative relations among information of each service; and a third module, for processing correlatively the service information according to the correlative relations.

In another embodiment, a service server is provided. The service server includes a module for receiving service information; a module for obtaining correlative relations among information of each service; and a module for performing a corresponding correlative processing on the service information according to the correlative relation.

It can be seen from the technical solutions according to the embodiments that, according to the correlative policies being set, the service server may determine the correlative relation of user configuration information carried in a service message, and accordingly perform the correlative processing. Therefore, the service messages of various applications under IMS architecture may be correlatively processed. With the method, the problem of correlative relation processing among service information may be solved, thereby the user experience of the service may be improved, and the service performance may be enhanced.

DETAILED DESCRIPTION OF THE EMBODIMENTS

The present embodiments provide a method and a service server for correlative processing of service information.

The method is applicable for various application services under IMS architecture, such as PoC services, CPM services, Conference services and XML services. The various application services may use service information carried in an SIP protocol message, and may also be other application services that describe the service information using XML language.

Figure 1:
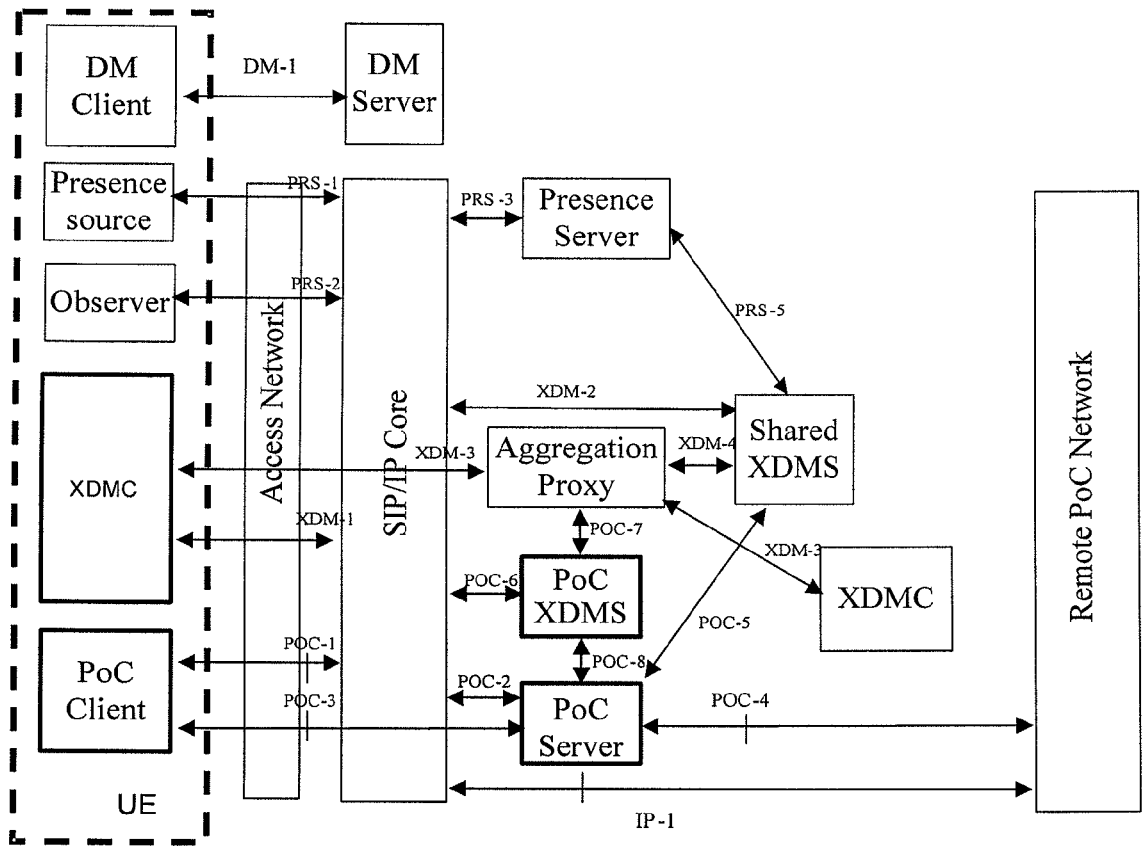
FIG. 1 is a network structural diagram defined in PoC standard specification.
Figure 2:
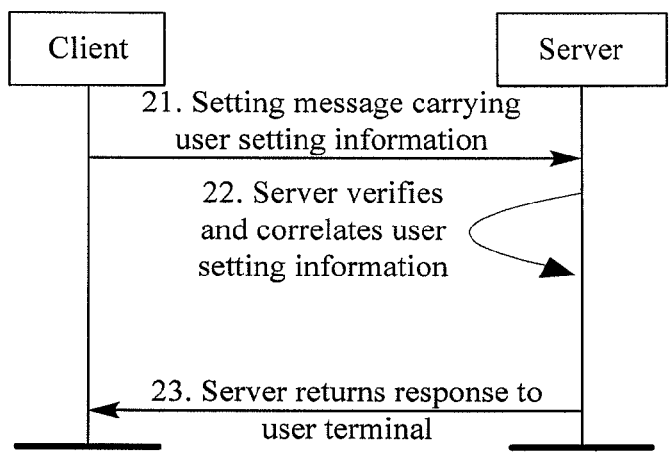
FIG. 2 is a flow chart of a method according to an embodiment of the invention, in which setting service message by a user in a PoC service is taken as an example.

In the following embodiment, the incorporation, mutual exclusive processing and the sequential processing procedure for the different service settings serving as the service information in the service setting information of the PoC service, are illustrated by taking user service setting information in the PoC service as an example. The process of the method according to the embodiment of the invention is shown in FIG. 2, which includes the following acts:

In act 21, a user terminal sends a setting message carrying user service setting information to a server.

In a communication system, a user may perform user service settings in an application server in the network, and requests the application server in the network to perform the corresponding operations according to the user settings. For example, the network may be configured to accept or reject a session request according to the user settings; or to deliver the saved service data according to the user settings; or a network entity in the network may be configured to operate media data according to the user settings; or to operate the message or the contents in the message according to the user settings.

At present, there are two ways to realize the above user settings. One way is that, a user terminal saves the user settings in a network entity of the network as a configuration file, which will not be automatically deleted if modification, deletion is not made by the user or no time-out. A user terminal that performs user setting in this way, such as an XDM Client, may be connected to an XDM server via XCAP protocol and add, delete and modify the above configuration file. The above configuration file may be widely used. For example, it may be used as general configuration information for other services; or it may configured as a specific service configuration for a certain service; or it may be used as the condition for user terminals access control; or it may be used as configuration information for group management.

The other mode is that, a user terminal uploads the user settings, and a network entity saves and applies the user settings. The user settings in such a mode include, for example, service settings of the PoC service and user settings published via an SIP PUBLISH request.

In the PoC service, a user terminal may be connected to a server via an interface protocol, and sends a setting message carrying various user setting information to the server. The server saves the user setting information carried in the message received. The user terminal may further add, delete and modify the above configuration file saved on the server.

In act 22, the server verifies and correlates the user setting information that is saved, and determines the processing mode of the user setting information.

Figure 3:
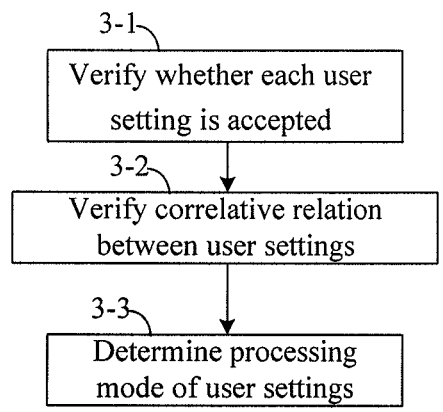
FIG. 3 is a flow chart of the specific processing of the server in the process shown in FIG. 2.

The server needs to verify and correlate the saved user setting information and determine the processing mode of the user setting information. One specific flow chart of the processing procedure of the server is shown in FIG. 3.

The server verifies whether each saved user setting information is valid and may be accepted. If the verification is passed, the server needs to obtain the correlative relations among setting information of each user according to the pre-configured correlative regulation. The above pre-configured correlative regulation may be generated according to the policies and/or schemes saved on the server; or may be carried in the above user setting message; in other words, it may directly identifies, in the user setting message, the mutual exclusive processing, the incorporative (concurrently) processing or the processing according to a certain sequence with other service settings.

After obtaining the correlative relations among setting information of each user, the server may obtain the processing mode of the user setting information. For example, part of the user service settings have to be processed incorporatively, for example, processed concurrently. Part of the user service settings are mutually exclusive, thus they may only be processed according to one or several service settings thereof. Part of the user service settings may only be processed according to a certain order.

In act 23, the server returns a response to the user terminal.

Furthermore, the server may return the obtained processing mode of the user setting information to the corresponding user terminal.

Figure 4:
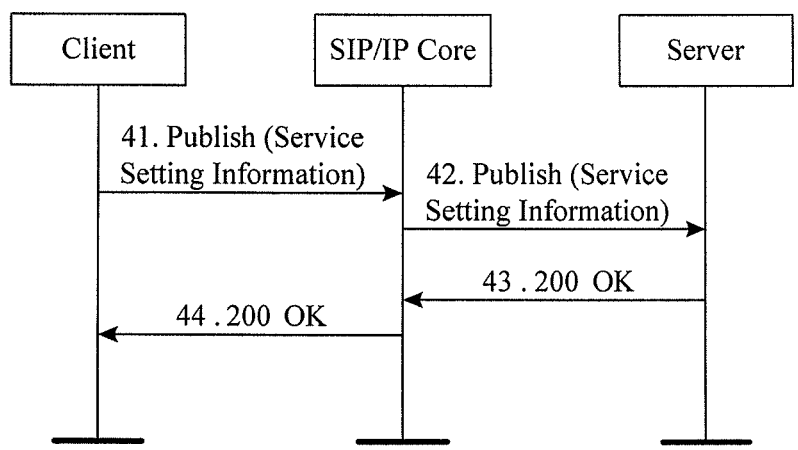
FIG. 4 is a schematic diagram of the process in which a user terminal publishes user setting information using a SIP PUBLISH request according to an embodiment of the invention.

The process above according to an embodiment of the invention is also provided. In this embodiment, a schematic diagram of the process in which a user terminal publishes user setting information using a SIP PUBLISH request is shown in FIG. 4, which includes the following acts:

In act 41, a Client (user terminal) publishes to an SIP network an SIP Publish message in which the service setting information published from the Client to the server (such as service setting information #1, service setting information #2, service setting information #3 and service setting information #4) are carried.

In act 42, the SIP network forwards the received SIP Publish message to the server. The server processes and saves the user service setting information carried in the SIP Publish message received. Then, the server verifies the correlative relations among the user service setting information according to the pre-configured correlative scheme, thereby obtaining various correlative processing modes of the service setting information.

Figure 5:
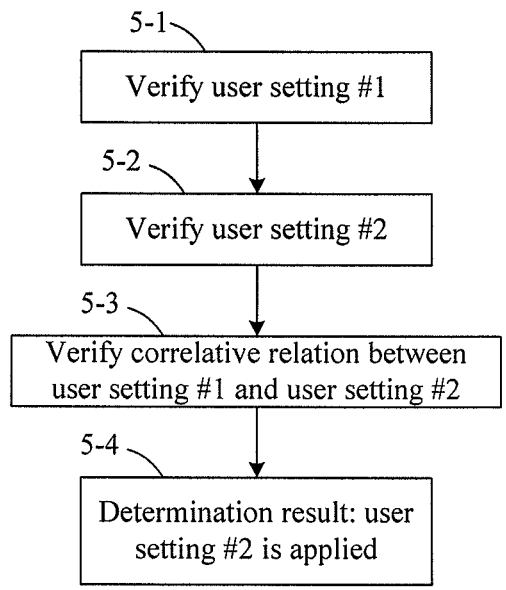
FIG. 5 is a schematic diagram of a processing procedure in one correlative processing mode according to an embodiment of the invention.

For example, a processing procedure of one correlative processing mode is shown in FIG. 5, which includes the following acts:

In act 5-1, a server verifies user setting #1;

In act 5-2, the server verifies user setting #2;

In act 5-3, the server verifies the correlative relation between the user setting #1 and the user setting #2; and In act 5-4, after a determination process, a specific correlative processing mode is obtained as follows: only the user setting #2 between the user setting #1 and the user setting #2 may be applied.

Figure 6:
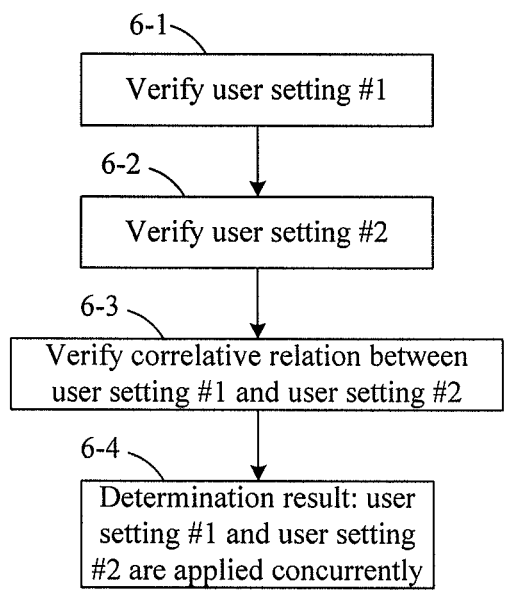
FIG. 6 is a schematic diagram of a processing procedure in one correlative processing mode according to an embodiment of the invention.

The processing procedure of another correlative processing mode is shown in FIG. 6, which includes the following acts:

In act 6-1, a server verifies user setting #1;

In act 6-2, the server verifies user setting #2;

In act 6-3, the server verifies the correlative relation between the user setting #1 and the user setting #2; and In act 6-4, after a determination process, the specific correlative processing mode is obtained as follows: both of the user setting #1 and user setting #2 shall be applied concurrently.

Figure 7:
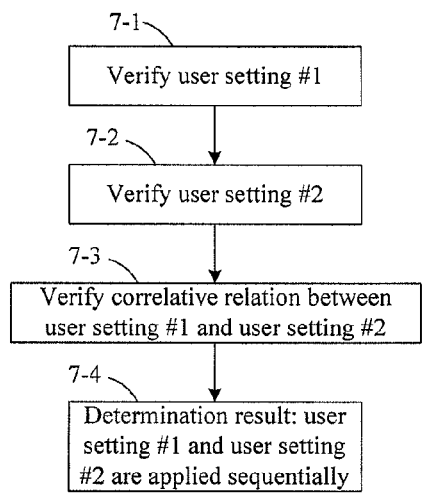
FIG. 7 is a schematic diagram of a processing procedure in one correlative processing mode according to an embodiment of the invention.

The processing procedure of another correlative processing mode is shown in FIG. 7, which includes the following acts:

In act 7-1, a server verifies user setting #1;

In act 7-2, the server verifies user setting #2;

In act 7-3, the server verifies the correlative relation between the user setting #1 and the user setting #2; and In act 7-4, after a determination process, the specific correlative processing mode is obtained as follows: for the user setting #1 and user setting #2, the user setting #1 shall be applied first and then the user setting #2.

In a messaging service, a user terminal may configure whether to save a message or the content in the message, whether to forward a message or the content in the message, whether to receive a message or the content in the message and whether to connect or fetch a message or the content in the message. The above settings may be based on the attribute of the message or the content in the message. The attributes may be the sending party of the message, the time for sending or receiving the message, the size of the message and the format of the message content and so on. The user setting modes include, but are not limited to the followings:

1) If a user setting for rejecting the reception or saving of a message of a certain part of the attributes or the content in the message is made, the user settings for downloading the message or the content in the message of the corresponding attribute is unreasonable. A network entity or a user terminal may determine and process the correlative relation between these two types of user settings, and only one type of settings on the message or the content in the message is allowed to be applied by the current user according to a policy.

2) If a user setting for receiving or unconditionally saving a message of a certain part of the attributes or the content in the message is made, when the user setting for downloading or connecting is made, the two user settings may be requested to use jointly by a network entity or a terminal according to the correlative relation between the two user settings, in other words, the two user settings are processed incorporatively. Alternatively, only the user setting that allows download or connection may be accepted by the network entity or the terminal after the user setting of saving unconditionally is made.

In a PoC system that is upgraded to be a multimedia communication system, the TBCP protocol and a floor are also correspondingly upgraded to the Media Burst Control Protocol (MBCP) and media transmission right. The embodiment further provides a method for correlative processing of allocation policy information of media resource transmission right in the PoC service.

Figure 8:
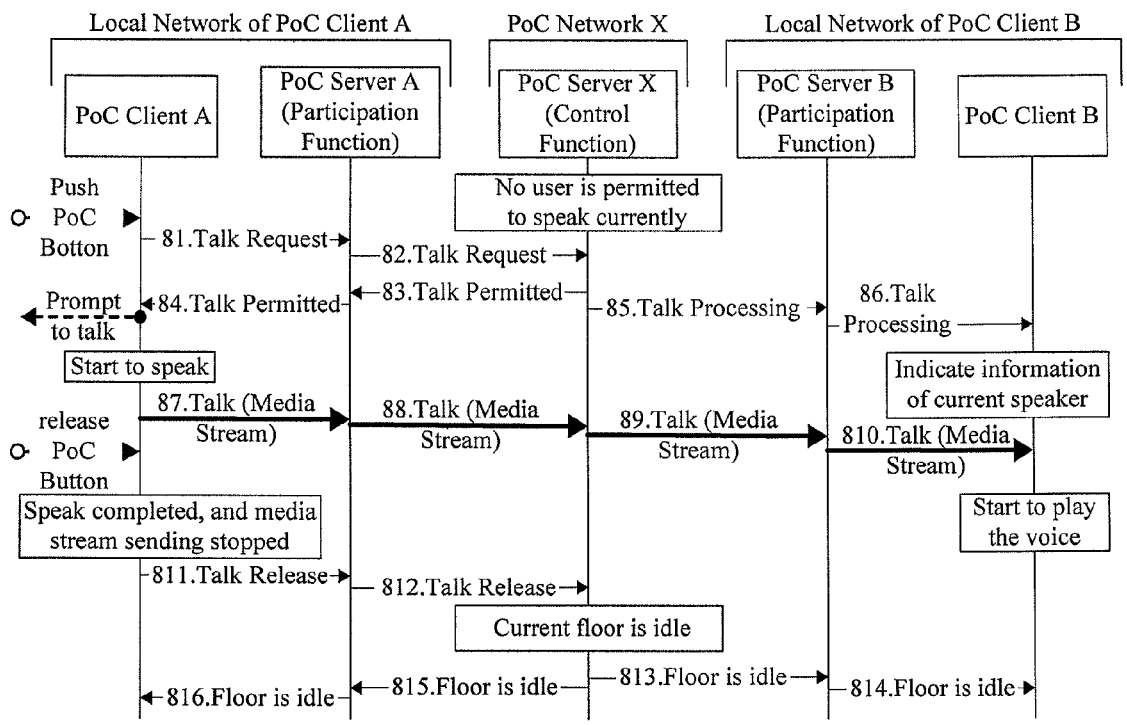
FIG. 8 is a flow chart of a process for applying for a floor of OMA PoC according to an embodiment of the invention.

FIG. 8 shows a flow chart of a process for applying for an OMA PoC floor according to one embodiment, which includes the following acts.

In acts 81-82, a user may request a floor from a PoC Server via a "Talk Burst Request" message of the TBCP protocol.

In acts 83-84, the PoC Server returns a "Talk Burst Granted" message to the applicant, thereby to inform the applicant of the obtaining of the floor and the permission to talk.

In acts 85-86, the PoC Server may also send a "Talk Burst Taken" message to other users, for informing other members participating the group session of the information of the current speaker.

In acts 87-810, the user that obtains the floor speaks, and the media stream thereof is forwarded to other members in the group by the PoC Server.

In acts 811-812, after the user speaks, the floor is released.

In acts 813-816, the group floor is idle, and the PoC Server broadcasts a "Floor Control Idle" message to the group members.

The media transmission right is a kind of right to send media. It may be applied in a communication system with a media stream control function, such as a Conference system and a PoC system. An allocation policy has been decided in a PoC server, and the media transmission right is managed via the allocation policy. The allocation policy is referred to as a MBC Scheme in an OMA PoC Version 2 system. When a certain MBC Scheme is applied to a PoC session, it may be determined which mode or scheme is employed by the PoC server to allocate the media transmission right. Additionally, a plurality of MBC Schemes may be applied in one session concurrently.

A certain correlative relation may exist among a plurality of MBC Schemes. For example, some MBC Schemes may not be used incorporatively, but part of MBC Schemes need to be used incorporatively in a certain scenario.

A typical application of the above MBC Scheme may be as follows: the media transmission right is allocated in turn according to a certain order; some users may not obtain the media transmission right; some users always obtain the media transmission right preferentially; the queues between different media control entities are incorporated; the queues between different media control entities are split; and one queue is allocated to several different media control entities.

As a policy, the MBC Scheme may be employed flexibly. The MBC Scheme may be applied to the whole PoC session as a policy; or may be applied to the allocation of the media transmission right for a certain media type as a policy; or may be applied to the allocation of the media transmission right for one certain media stream as a policy.

Among different MBC Schemes, part of the allocation policies may not be used concurrently. Instead, the correlative processing of the applied MBC Scheme information is required to be determined and performed by the server, the network entity or the user terminal.

As the media transmission right allocation policy, the MBC Scheme may be saved in a PoC pre-arranged group. When a PoC session is established, the PoC server queries the above pre-arranged group and obtains the saved MBC Scheme. The PoC server applies the specific one or more MBC Schemes to the PoC session.

The MBC Scheme may also act as the local policy information saved on a PoC server. When a PoC session is established, the PoC server obtains the saved MBC Scheme by querying the local policy information. The PoC server applies the specific one or more MBC Schemes to the PoC session.

On embodiment further provides that a MBC Scheme is applied in a PoC session. After obtaining each MBC Schemes required to be applied to the PoC session according to an indication request sent from a PoC Client, the PoC server performs the correlation and determination processing among each MBC Schemes and applies the determination result.

In the PoC service, a MBC Scheme may be contained in a message body of a session request message and a session response message, and indicated by a specific SDP parameter. In the embodiment, the MBC Scheme corresponding to the management relation of the media transmission right allocation policy information described as a part of the session description in the message body, in which the management relation, the MBC Scheme represents the correlative relation that would be collocated between the media transmission right allocation policy and other Session Description Protocol (SDP) parameters and other service information in the SIP message. The correlative relations between the media transmission right allocation policy and other Session Description Protocol (SDP) parameters and other service information in the SIP message include the incorporative processing correlative relation, mutual exclusive relation and sequential processing correlative relation.

Figure 9:
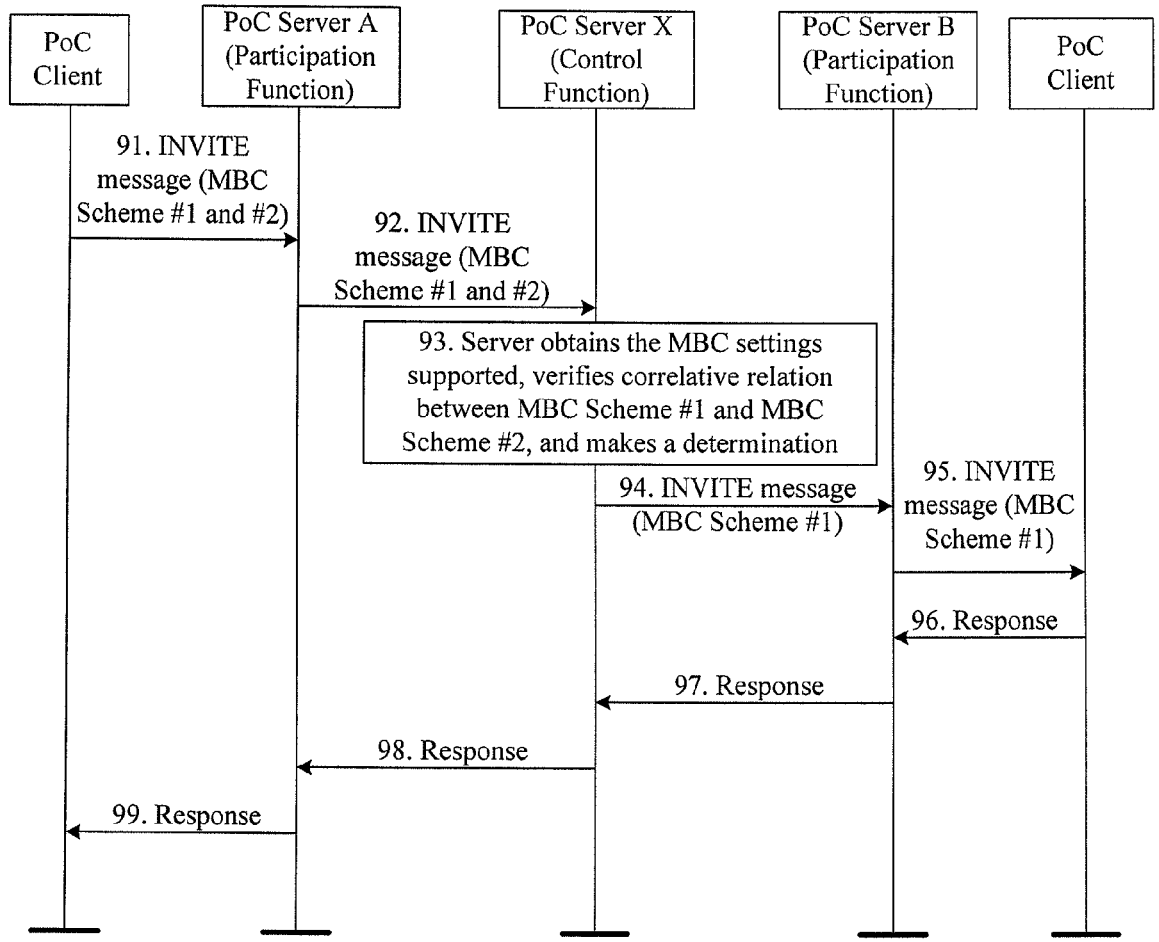
FIG. 9 is a flow chart of a process for determining a media resource sending policy according to an embodiment of the invention in which the MBC Scheme is applied in a PoC session.

In the above embodiment, the user carries the required resource allocation policy in a session establishment request. The process for determining the media resource sending policy in the above embodiment is shown in FIG. 9, which includes the following acts.

In acts 91-92, a calling PoC Client sends a session establishment request carrying resource allocation policy parameters MBC Scheme #1 and MBC Scheme #2 to a PoC server that performs CF. The session establishment request may be carried by an INVITE message of SIP;

In act 93, the PoC server that performs CF extracts a media resource transmission right parameter from the received session establishment request, queries the MBC Schemes that may be applied to the PoC session, verifies the correlative relation between MBC Scheme #1 and MBC Scheme #2, determines how to apply the MBC Schemes, and determines the media resource transmission right allocation policy of the currently established multi-party communication service.

In acts 94-95, the server that performs CF establishes a session with each called PoC Client in the current multi-party communication service.

In acts 96-99, the PoC system returns a session establishment response, which may be carried by a 200 OK message of SIP, to the calling PoC Client.

In act 910, after establishing the multi-party communication service, the server that performs CF allocates a media resource transmission right to the calling PoC Client and each called PoC Client according to the media resource transmission right allocation policy, MBC Scheme #1 determined in act 93.

The implementation of the processing of correlative relation among MBC Schemes will now be verified by several examples.

1) If a PoC Client requests to establish a session, as optional MBC Schemes, voice media stream cycles forwardly (round robin) among a plurality of users, and video media stream cycles reversely among a plurality of users. At this point, the MBC Scheme may only accept one of the media transmission right allocation policies, i.e., one of the forward cycling policy or the reverse cycling policy. A mutual exclusive correlative operation is employed between the two policies.

2) If a PoC Client requests to establish a session, an optional MBC Scheme #1 allocates a policy #1 for all the continuous media streams in the whole session, while MBC Scheme #2 requests the voice media stream applying allocation policy #2; if the policy allocated to the whole session and the policy allocated to a certain media stream are conflicting with each other, one of the mutual exclusive media resource transmission right allocation policies is selected according to the determination and processing of the correlative relation among the media resource transmission right allocation policies made by the PoC server.

3) If a PoC Client requests to establish a session, the indication in the request requires that the optional MBC Scheme #1 and MBC Scheme #2 are concurrently applied to two different media streams in a PoC session, thus the PoC server needs to simultaneously apply two media resource transmission right allocation policies according to the determination and processing of the correlative relation between the two media resource transmission right allocation policies.

In one embodiment, a method for correlative processing of an indication message in an SIP message header or an SIP message body.

The indication message in the SIP message instructs the SIP protocol stack to perform the corresponding incorporative or mutual exclusive processing on the SIP message.

At present, a part of indication messages, such as indication messages representative of user selection, auto answer, manual answer, automata and audio, in the SIP messages are usually used jointly. For example, if a Require indication message occurs, the SIP protocol stack performs incorporative correlative processing on the indication message and the Require identifier, and use them together. When a mutual exclusive relation exists between a certain indication message or identifier and another indication message or identifier, the SIP protocol stack performs mutual exclusive correlative processing on the indication message and the Require identifier, and only one certain indication message or identifier may be applied at a time.

A service message (such as a SIP protocol message, a HTTP service message and a XCAP service message) may include several kinds of service information. In a common mode for carrying service information, a part of the service information, such as the service setting information included in an SIP Publish message for uploading service settings via an SIP message, and the service information included in an XCAP protocol message sent from an XDM terminal to an XDM server using XCAP protocol, are described in XML language.

Because the XML language allows adding a correlative attribute to certain service information, it may be used to process the correlative relation between the service descriptions in the message body of the SIP message. The correlative relation may be incorporative processing, mutual exclusive processing or processing in a pre-configured sequence. After receiving the above SIP message that carries the XML language, the SIP protocol stack may perform the correlative processing.

In one embodiment, the existing XML data verification mechanism may be used for realizing the description of the correlative relation. At present, XML data verification uses the XML Schema technology. XML Schema defines the marks and data types used in the syntax via XML language. Because the architecture of XML Schema itself is the XML language, thus has the extensibility owned by the XML language, and no other syntax is required for representation. Such a data verification technology may indicate the relations required by the correlative services, for example, relations of the incorporative processing, mutual exclusive processing or processing in a pre-configured sequence. The representation of XML Schema that indicates the different correlative services processing relations is shown in the following table.

| Correlative Relations | XML Schema schemes | XML Language Expression |
|---|---|---|
| Incorporative Relation | <ElementType name="a" ><br><group><br>  <element type="b"/><br>  <element type="c"/><br></group><br></ElementType> | <a><br>  <b/><br>  <c/><br></a><br>or<br><a><br>  <c/><br>  <b/><br></a> |
| sequential Relation | <ElementType name="a" order="seq"><br>  <element type="b"/><br>  <element type="c"/><br></ElementType> | <a><br>  <b/><br>  <c/><br></a> |
| Mutual Exclusive Relation | <ElementType name="a" order="one"><br>  <element type="b"/><br>  <element type="c"/><br></ElementType> | <a><br>  <b/><br></a><br>or<br><a><br>  <c/><br></a> |

The CPM provides, to a user, a service for sending IP-based convergence message. In a CPM service, the sending, receiving, storing and processing of messages may be determined according to the user service information. The determination of the correlative relations between the service information designated by a user in the CPM service includes the correlative relations of incorporative processing, mutual exclusive processing and sequential processing.

For example, a CPM service may provide network-based storage to a user, and the service for receiving a message by a user and the service for storing the message in the network storage need to be processed as correlative services.

The user may configure a mutual exclusive relation between these two services. Therefore, a message may be sent to a user device without stored in the network storage, or the message may be stored in the network storage and only a prompt of a new message is received by the user. Alternatively, the user may also configure an incorporative relation between these two services. As a result, the message is not only sent to the user device, but also stored in the network storage. For the management of the network storage, the user also needs to configure a correlative relation among different services. For example, the user may configure to automatically store the message in the network storage; and similarly, a warning threshold of remaining space of the network storage may also be configured. If it is expected for the network storage not to store a new message once the warning threshold exceeds, the user needs to configure the correlative relation between these two services as the mutual exclusive relation.

Figure 10:
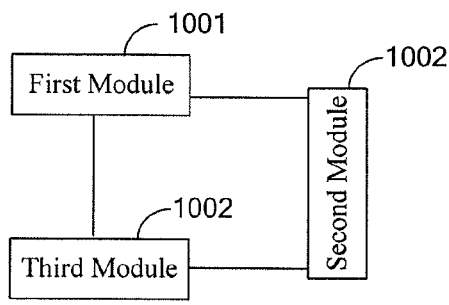
FIG. 10 is a structural diagram of a service server according to an embodiment of the invention.

Furthermore, an embodiment provides a service server for correlative processing of service information, as shown in FIG. 10, which includes: a first module 1001, for receiving service information; a second module 1002, for obtaining a correlative relation among information of each service; and a third module 1003, for performing a corresponding correlative processing according to the correlative relation.

The third module may include: a first sub-module, for obtaining the processing mode of the service information according to a correlative relation; and a second sub-module, for performing a corresponding correlative processing according to the processing mode.

The second sub-module may include: a first unit, for performing incorporative processing on the service information; and/or a second unit, for performing mutual exclusive processing on the service information; and/or a third unit, for processing the service information in a pre-configured sequence.

The second module may include: a third sub-module, for obtaining a correlative scheme; and a fourth sub-module, for obtaining a correlative relation among information of each service according to the correlative scheme.

The third sub-module may include: a fourth unit, for generating the correlative scheme according to a policy and/or scheme that is stored; or a fifth unit, for receiving a setting message in which the correlative scheme is carried; and a sixth unit, for obtaining the correlative scheme from the setting message.

The setting message may be an SIP message. The first module may include a sub-module for receiving an SIP message, in which the service information is carried in the indication or identifier.

The service server may also include: a fourth module, for verifying whether the service information received is valid.

An embodiment further provides a service server for managing the service information, which includes: a module for receiving service information; a module for obtaining a correlative relation among information of each service; and a module for performing a corresponding correlative processing on the service information according to the correlative relation.

The service server may also include: a module for verifying whether the received service information is valid.

The above description is only the preferred embodiments of the invention. However, the scope of the invention is not limited to these. Additional changes and modifications within the disclosure of the invention that readily occurs to those skilled in the art shall be covered within the scope of the invention. Accordingly, the scope of the invention shall be defined by the appended claims and their equivalents.

What is claimed is:

1. A method for correlative processing of service information, implemented by a service server in a communication system, comprising:
   receiving two or more pieces of service information of a service sent from a user terminal;
   obtaining a correlative relation among the two or more pieces of service information of the service, comprising:
      obtaining a correlative scheme, and
         obtaining the correlative relation among the two or more pieces of service information of the service according to the correlative scheme; and
   processing the two or more pieces of service information of the service in a pre-configured sequence according to the correlative relation, wherein each of the two or more pieces of service information comprises a resource allocation policy parameter, and receiving the two or more pieces of service information of the service comprises receiving one or more session establishment request messages each carrying at least one resource allocation policy parameter, and wherein the correlative scheme is a Media Burst Control scheme, and obtaining the correlative relation among the two or more pieces of service information of the service comprises:
      obtaining the Media Burst Control scheme from a group pre-configured in a session, and obtaining the correlative relation among the resource allocation policy parameters according to the obtained Media Burst Control scheme.

2. The method according to claim 1, wherein processing the two or more pieces of service information of the service in a pre-configured sequence according to the correlative relation comprises:
   obtaining a processing mode of the two or more pieces of service information according to the correlative relation; and
   processing the two or more pieces of service information of the service in the pre-configured sequence according to the processing mode.

3. The method according to claim 1, wherein obtaining the correlative scheme comprises:
   receiving a setting message in which the correlative scheme is carried, and obtaining the correlative scheme from the setting message.

4. The method according to claim 1, wherein obtaining the correlative scheme comprises:
   generating the correlative scheme according to at least one of a policy and a correlative scheme that is/are stored.

5. A service server in a communication system, comprising:
   a first module, configured to receive two or more pieces of service information of a service sent from a user terminal;
   a second module, configured to obtain a correlative relation among the two or more pieces of service information of the service by obtaining a correlative scheme, and obtaining the correlative relation among the two or more pieces of service information of the service according to the correlative scheme; and
   a third module, configured to process the two or more pieces of service information of the service in a pre-configured sequence according to the correlative relation, wherein each of the two or more pieces of service information comprises a resource allocation policy parameter, and the processing the two or more pieces of service information of the service comprises receiving one or more session establishment request messages each carrying at least one resource allocation policy parameter, and wherein the correlative scheme is a Media Burst Control scheme, and obtaining the correlative relation among the two or more pieces of service information of the service comprises:
   obtaining the Media Burst Control scheme from a group pre-configured in a session, and obtaining the correlative relation among the resource allocation policy parameters according to the obtained Media Burst Control scheme.

6. The service server according to claim 5, wherein the third module comprises:
   a first sub-module, configured to obtain a processing mode of the two or more pieces of service information according to the correlative relation; and
   a second sub-module, configured to process the two or more pieces of service information of the service in a pre-configured sequence according to the processing mode.

7. The service server according to claim 5, wherein the second module is configured to receive a setting message in which the correlative scheme is carried; and configured to obtain the correlative scheme from the setting message.

\* \* \* \* \*

UNITED STATES PATENT AND TRADEMARK OFFICE
CERTIFICATE OF CORRECTION

PATENT NO. : 9,185,143 B2
APPLICATION NO. : 12/357180
DATED : November 10, 2015
INVENTOR(S) : Lei Zhu et al.

It is certified that error appears in the above-identified patent and that said Letters Patent is hereby corrected as shown below:

Title Page, First Column

Under "(65)   Prior Publication Data

US 2009/0144356 A1   Jun. 4 2009"

Insert   --Related U.S. Application Data

(63)   Continuation of application No. PCT/CN2007/071017, filed on Nov. 5, 2007.--.

(30)   Foreign Application Priority Data, Line 2

Delete "Nov. 5, 2007   (WO)............... PCT/CN2007/071017".

Signed and Sealed this
Second Day of February, 2016

Michelle K. Lee
*Director of the United States Patent and Trademark Office*